US009813584B2

(12) United States Patent
Uenishi

(10) Patent No.: US 9,813,584 B2
(45) Date of Patent: Nov. 7, 2017

(54) IMAGE PROCESSING APPARATUS CAPABLE OF PERFORMING IMAGE PROCESSING IMMEDIATELY AFTER STARTING TO BE SUPPLIED WITH AN EXTERNAL VOLTAGE

(71) Applicant: KYOCERA Document Solutions Inc., Osaka-shi, Osaka (JP)

(72) Inventor: Hiroyuki Uenishi, Osaka (JP)

(73) Assignee: KYOCERA Document Solutions Inc. (JP)

(*) Notice: Subject to any disclaimer, the term of this patent is extended or adjusted under 35 U.S.C. 154(b) by 31 days.

(21) Appl. No.: 14/948,619

(22) Filed: Nov. 23, 2015

(65) Prior Publication Data
US 2016/0156808 A1    Jun. 2, 2016

(30) Foreign Application Priority Data

Nov. 28, 2014  (JP) ................................. 2014-241286

(51) Int. Cl.
*H04N 1/327* (2006.01)
*H04N 1/00* (2006.01)
(52) U.S. Cl.
CPC ....... *H04N 1/32767* (2013.01); *H04N 1/0032* (2013.01); *H04N 1/00411* (2013.01);
(Continued)
(58) Field of Classification Search
None
See application file for complete search history.

(56) References Cited

U.S. PATENT DOCUMENTS

2008/0309644 A1* 12/2008 Arimoto ............. H04N 1/0035
345/173
2013/0063778 A1* 3/2013 Nagasawa .......... H04N 1/00204
358/1.15

FOREIGN PATENT DOCUMENTS

JP    H05088490 A    4/1993
JP    H08248830 A    9/1996
(Continued)

OTHER PUBLICATIONS

Japanese Office Action dated Aug. 16, 2016.

*Primary Examiner* — Eric A Rust
*Assistant Examiner* — Pawandeep Dhingra
(74) *Attorney, Agent, or Firm* — Gerald E. Hespos; Michael J. Porco; Matthew T. Hespos

(57) ABSTRACT

An image processing apparatus includes a switch section, a power supply section, an operation display section, an initialization control section, an image processing section, and a condition receiving section. The initialization control section causes the operation display section to start a first initialization processing when supply of a power supply voltage is started, and subsequently causes the image processing section to start a second initialization processing. The condition receiving section accepts an input of an execution condition. The operation display section includes a display part, a storage part, a display control part, and a condition setting part. The display control part causes the display part to display a screen after completion of the first initialization processing. The condition setting part stores an execution condition inputted via the screen in the storage part, and outputs the execution condition to the condition receiving section after completion of the second initialization processing.

5 Claims, 5 Drawing Sheets

(52) U.S. Cl.
CPC ..... *H04N 1/00891* (2013.01); *H04N 1/32791* (2013.01); *H04N 2201/0094* (2013.01)

(56) References Cited

FOREIGN PATENT DOCUMENTS

| | | |
|---|---|---|
| JP | H11334179 A | 12/1999 |
| JP | 2000032197 A | 1/2000 |
| JP | 2002225394 A | 8/2002 |
| JP | 2006224327 A | 8/2006 |
| JP | 2010-274575 | 12/2010 |
| JP | 2013-207774 | 10/2013 |

\* cited by examiner

IMAGE PROCESSING APPARATUS CAPABLE OF PERFORMING IMAGE PROCESSING IMMEDIATELY AFTER STARTING TO BE SUPPLIED WITH AN EXTERNAL VOLTAGE

INCORPORATION BY REFERENCE

This application is based on Japanese Patent Application No. 2014-241286 filed with the Japan Patent Office on Nov. 28, 2014, the contents of which are hereby incorporated by reference.

BACKGROUND

The present disclosure relates to an image processing apparatus and, in particular, to a technique of causing an image processing apparatus to perform an image processing immediately after starting to be supplied with an external voltage.

Image processing apparatuses such as copiers and scanners are configured to perform a specific initialization processing upon supply of an external voltage and perform an image processing after completing the initialization processing. Accordingly, techniques have been conventionally worked out that shorten the time required for an initialization processing so that an image processing apparatus can perform an image processing immediately after starting to be supplied with an external voltage.

For example, image forming apparatuses are known which perform, when the power is turned on, communication with an external device storing information necessary for initialization and information for use in jobs. The image forming apparatus receives the information necessary for initialization from the external device when the power is turned on, and performs initialization based on the received information. Subsequently, the image forming apparatus receives the information for use in jobs from the external device.

Thus, the image forming apparatus receives the information necessary for initialization and the information for use in jobs stored in the external device at the different timings, thereby reducing the load of receiving information from the external device at a power-on to thereby shorten the time required for the initialization.

Further, image forming apparatuses are known which are switchable between a power saving mode for reducing power consumption and a printable mode for performing a printing job. The image forming apparatus, when receiving printing data including a scheduled time for execution of a printing job from a terminal device, switches from the power saving mode to the printable mode before the scheduled time for execution of the printing job included in the printing data.

Thus, the image forming apparatus does not shorten the time required to switch from the power saving mode to the printable mode, but switches from the power saving mode to the printable mode before the scheduled time for execution of the printing job, thereby making it possible to perform the printing job immediately after the scheduled time.

SUMMARY

An image processing apparatus according to the present disclosure includes a switch section, a power supply section, an operation display section, an image processing section, an initialization control section, and a condition receiving section. The switch section is operated to start supply of an external voltage. The power supply section uses the external voltage to generate a power supply voltage and supply the generated power supply voltage. The operation display section uses the power supply voltage to perform an operation. The image processing section uses the power supply voltage to perform a specific image processing. The initialization control section causes the operation display section to start a predetermined first initialization processing when the power supply section starts to supply the power supply voltage in response to the operation of the switch section by a user, and causes the image processing section to start a predetermined second initialization processing after the start of the first initialization processing. The condition receiving section accepts an input of an execution condition for use in the image processing. The operation display section includes a display part, a storage part, a display control part and a condition setting part. The display control part causes the display part to display an operation screen allowing an input of the execution condition after completion of the first initialization processing. The condition setting part, when the execution condition is inputted via the operation screen during the second initialization processing, stores the execution condition in the storage part and outputs the execution condition stored in the storage part to the condition receiving section after completion of the second initialization processing.

These and other objects, features and advantages of the present disclosure will become more apparent upon reading the following detailed description along with the accompanying drawings.

DETAILED DESCRIPTION

Hereinafter, an embodiment of an image processing apparatus according to the present disclosure will be described with reference to the accompanying drawings. In this embodiment, the image processing apparatus is illustrated as a multifunctional apparatus. However, it is not intended to limit the present disclosure to this configuration. The image processing apparatus may alternatively be configured as a copier, a printer, a facsimile apparatus, or a scanner, for example.

Figure 1:
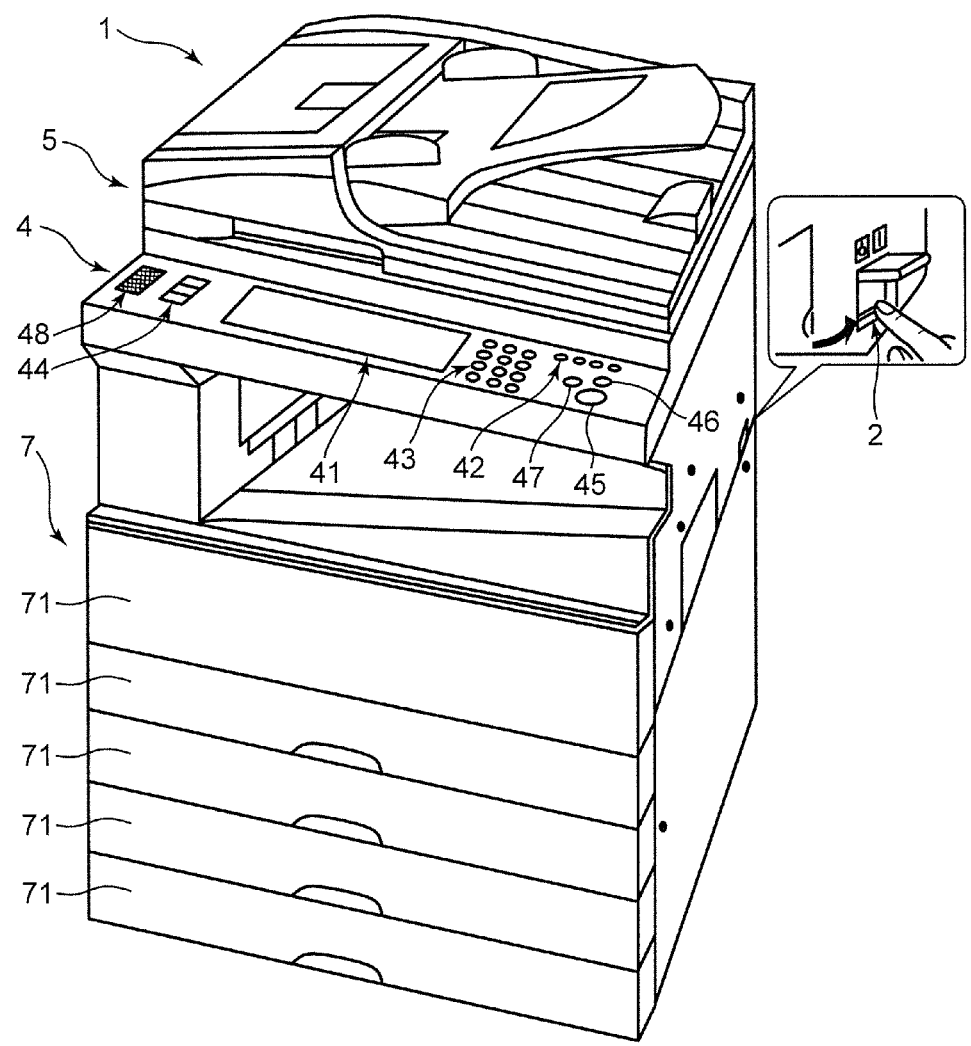
FIG. 1 is an external view of a multifunctional apparatus of an embodiment of an image processing apparatus according to the present disclosure.
Figure 2:
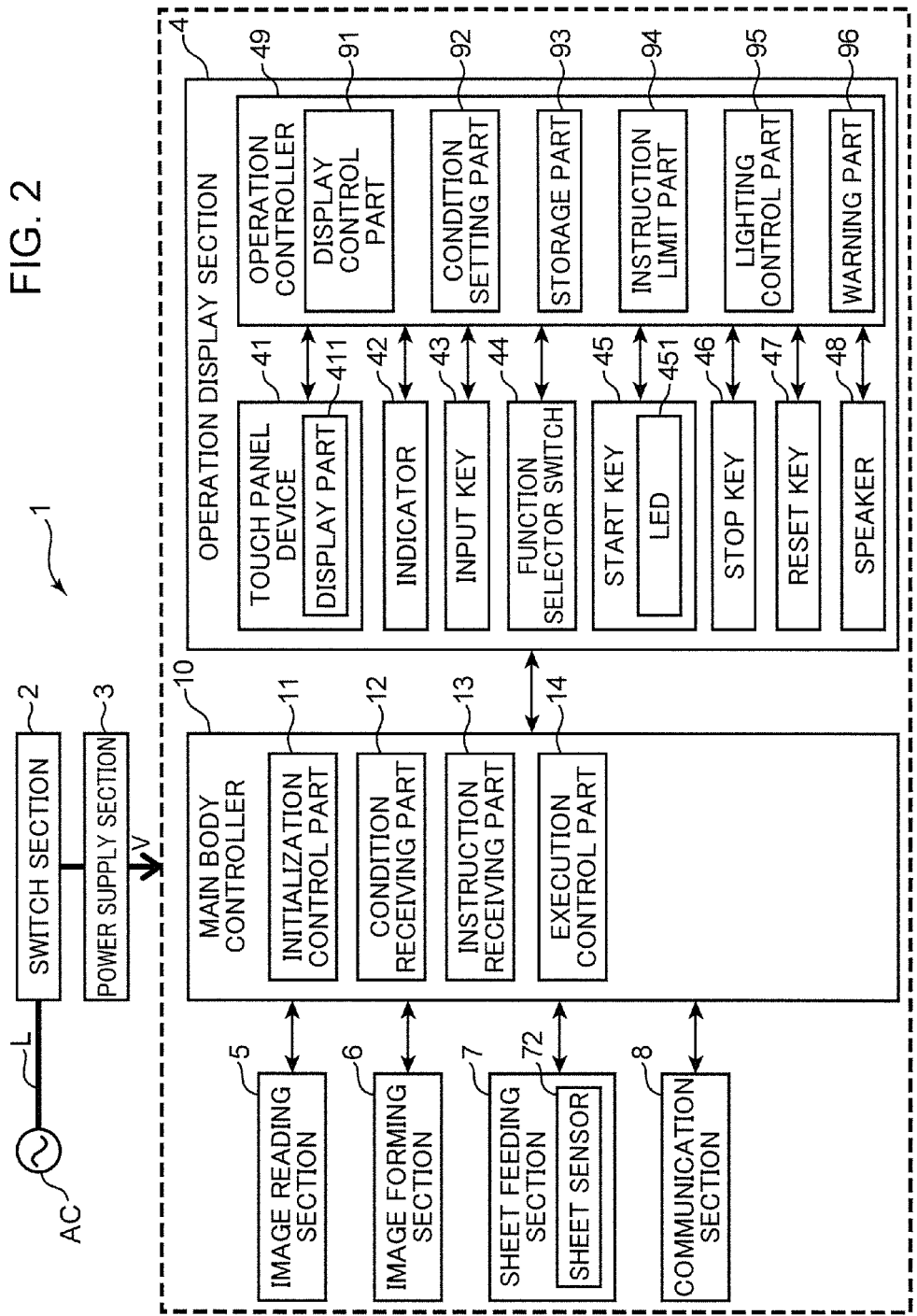
FIG. 2 is a block diagram showing an electrical configuration of the multifunctional apparatus.

FIG. 1 is an external view of a multifunctional apparatus 1 of an embodiment of an image processing apparatus according to the present disclosure. FIG. 2 is a block diagram showing an electrical configuration of the multifunctional apparatus 1. As shown in FIGS. 1 and 2, the multifunctional apparatus 1 includes a switch section 2, a power supply section 3, an image reading section 5 (image processing section), an image forming section 6 (image processing section), a sheet feeding section 7 (image processing section), a communication section 8 (image processing section), an operation display section 4, and a main body controller 10.

The switch section 2 is disposed on, for example, a side surface of the multifunctional apparatus 1 as shown in FIG. 1. The switch section 2 is operated to switch between an ON state (closed state) and an OFF state (open state) by a user. The switch section 2 is connected to one end of a power cable L. The other end of the power cable L is connected with an external alternating current power supply AC.

When the switch section 2 is switched to the ON state by a user, an alternating current voltage (external voltage) is supplied from the alternating current power supply AC to the power supply section 3 via the power cable L. On the other hand, when the switch section 2 is switched to the OFF state by a user, the supply of alternating current voltage from the alternating current power supply AC to the power supply section 3 is interrupted.

The power supply section 3 is disposed inside the multifunctional apparatus 1. The power supply section 3 uses the alternating current voltage supplied from the alternating current power supply AC to generate a power supply voltage V. The power supply section 3 supplies the generated power supply voltage V to the image reading section 5, the image forming section 6, the sheet feeding section 7, the communication section 8, the operation display section 4, and the main body controller 10.

Specifically, the power supply section 3 includes an unillustrated AC/DC converter. The power supply section 3 converts the alternating current voltage supplied from the alternating current power supply AC via the switch section 2 into a direct current voltage at a specific level by means of the AC/DC converter. In this manner, the power supply section 3 generates the direct current voltage as the power supply voltage V.

The image reading section 5 is disposed in an upper portion of the multifunctional apparatus 1 as shown in FIG. 1. The image reading section 5 includes an unillustrated optical system unit having a CCD (Charge Coupled Device) line sensor, an exposure lamp, for example.

The image reading section 5 performs its initialization processing (second initialization processing) under control of the main body controller 10 when the power supply section 3 starts to supply the power supply voltage V. The initialization processing of the image reading section 5 includes a calibration processing for improving the accuracy of reading of an image by the optical system unit, for example.

After completing the above-mentioned initialization processing, the image reading section 5 uses the power supply voltage V to perform an image reading processing (image processing) under control of the main body controller 10. In the image reading processing, the image reading section 5 uses the optical system unit to read an image of an original document, generates image data representing the image of the original document, and outputs the image data to the main body controller 10.

The image forming section 6 is disposed inside the multifunctional apparatus 1. The image forming section 6 has a known configuration including a photoconductive drum, a charger, an exposure part, a developing part, a transfer part, a fixing part, and a discharge part, for example.

The image forming section 6 performs its initialization processing (second initialization processing) under control of the main body controller 10 when the power supply section 3 starts to supply the power supply voltage V. The initialization processing of the image forming section 6 includes a warm-up processing to warm the fixing part to a specific temperature, for example.

After completing the above-mentioned initialization processing, the image forming section 6 uses the power supply voltage V to perform an image formation processing (image processing) under control of the main body controller 10. In the image formation processing, the image forming section 6 forms an image on a sheet, the image being represented by image data received by the main body controller 10.

The sheet feeding section 7 includes a plurality of sheet feeding cassettes 71 disposed in a lower portion of the multifunctional apparatus 1 as shown in FIG. 1. Each of the sheet feeding cassettes 71 stores sheets to be used in the image formation processing. Further, each of the sheet feeding cassettes 71 includes an unillustrated sheet feeding roller for picking up a sheet and a sheet sensor 72 for detecting the number of sheets stored therein.

The sheet feeding section 7 performs its initialization processing (second initialization processing) under control of the main body controller 10 when the power supply section 3 starts to supply the power supply voltage V. The initialization processing of the sheet feeding section 7 includes a sheet check processing, for example. In the sheet check processing, the sheet feeding section 7 determines whether each of the sheet feeding cassettes 71 stores a sheet. In the sheet check processing, the sheet feeding section 7 determines whether one sheet has been detected by each of the sheet sensors 72, for example.

After completing the above-mentioned initialization processing, the sheet feeding section 7 uses the power supply voltage V to perform a sheet feeding processing (image processing) under control of the main body controller 10. In the sheet feeding processing, the sheet feeding section 7 feeds a sheet to be subjected to image formation in the image formation processing by an unillustrated sheet feeding roller.

The communication section 8 is disposed inside the multifunctional apparatus 1. The communication section 8 is connected to an unillustrated network such as LAN (Local Area Network). The communication section 8 includes a communication interface circuit for transmitting and receiving various kinds of data to and from an external device (such as personal computer) connected with the network.

The communication section 8 performs its initialization processing (second initialization processing) under control of the main body controller 10 when the power supply section 3 starts to supply the power supply voltage V. The initialization processing of the communication section 8 includes a port initialization processing to check whether a communication port for transmitting and receiving data operates normally, for example.

After completing the above-mentioned initialization processing, the communication section 8 uses the power supply voltage V to perform an image receiving processing (image processing) and an image transmitting processing (image processing) under control of the main body controller 10. In the image receiving processing, the communication section 8 receives image data to be used in the image formation processing from an external device and outputs the received image data to the main body controller 10. In the image transmitting processing, the communication section 8 transmits the image data outputted in the image reading processing to a specified external device.

The operation display section 4 is disposed in a front portion of the multifunctional apparatus 1 as shown in FIG. 1. The operation display section 4 uses the power supply voltage V to perform an operation. The operation display section 4 allows a user to input various operation instructions.

Specifically, the operation display section 4 includes a touch panel device 41, an indicator 42, an input key 43, a function selector switch 44, a start key 45 (input part), a stop key 46, a reset key 47, a speaker 48, and an operation controller 49.

The touch panel device 41 includes a display part 411 such as liquid crystal display. The touch panel device 41 executes a capacitance type touch panel function which detects a screen component such as soft key that is displayed on the display part 411 and is touched by a user with a pointer such as finger or pen, based on a capacitance change which occurs when the user brings the pointer into proximity to the display part 411. The touch panel is not limited to the capacitance type, but may be an ultrasonic type or an optical type, for example.

The indicator 42 includes light emitting elements such as LED. The indicator 42 indicates a state of the multifunctional apparatus 1 by flashing or turning the light on or off. The input key 43 is provided to allow a user to input numerals and symbols or to delete or enter an inputted character string.

The function selector switch 44 is used to select the aimed function. Functions that can be performed in the multifunctional apparatus 1 include a copy function and a transmission function, for example. The copy function means a function of causing the image reading section 5 to perform the image reading processing and subsequently causing the image forming section 6, while causing the sheet feeding section 7 to perform the sheet feeding processing, to perform the image formation processing using image data outputted in the image reading processing and a sheet being fed in the sheet feeding processing. The transmission function means a function of causing the image reading section 5 to perform the image reading processing and subsequently causing the communication section 8 to perform the image transmitting processing using the image data outputted in the image reading processing. The function selector switch 44 includes, for example, a switch for changing the aimed function to the copy function and a switch for changing the aimed function to the transmission function, for example.

The function selector switch 44 is pushed down to thereby change the aimed function. In this case, the operation controller 49 described later controls the display part 411 to display an operation screen corresponding the selected function. The term "operation screen which corresponds to a function" means an operation screen for allowing an execution condition for a selected function to be inputted. The execution condition will be described later.

The start key 45 is provided to accept an input of an execution instruction to execute the function corresponding to an operation screen that is displayed on the display part 411. For example, in a case where an operation screen corresponding to the copy function is displayed on the display part 411, an execution instruction to execute the copy function is inputted when the start key 45 is pushed down.

Further, the start key 45 includes an LED 451 (light emitting element) which is turned on and off under control of a lighting control part 95 described later.

The stop key 46 is provided to suspend execution of a function. The reset key 47 is provided to restore an inputted execution condition for a function to a predetermined default value.

The speaker 48 emits a sound in accordance with previously inputted audio data under control of a warning part 96 described later. The speaker 48 may be configured to be capable of emitting only a so-called beep. In this case, the speaker 48 emits the beep under control of the warning part 96 described later.

The operation controller 49 controls an operation of each component of the operation display section 4. Specifically, the operation controller 49 includes an unillustrated CPU (Central Processing Unit) for performing a specific arithmetic processing, an unillustrated non-volatile memory such as EEPROM storing a specific control program, an unillustrated RAM (Random Access Memory) for temporarily storing data, and peripheral circuits, for example.

The operation controller 49 uses the CPU to execute a control program stored in the non-volatile memory or the like to thereby operate as a display control part 91, a condition setting part 92, an instruction limit part 94, the lighting control part 95, and the warning part 96, for example. The operation controller 49 uses a part of the storage region of the RAM as a storage part 93.

The display control part 91 performs an initialization processing (first initialization processing) of the operation display section 4 under control of the main body controller 10 when the power supply section 3 starts to supply the power supply voltage V. The initialization processing of the operation display section 4 includes a data load processing, for example. In the data load processing, the display control part 91 stores initialization data which is outputted by the main body controller 10 to the operation controller 49 for execution of the initialization processing of the operation display section 4. The initialization data includes screen data representing operation screens, audio data representing a warning sound, initial function data indicating an initial function, and default values of execution conditions for functions, for example.

After completing the initialization processing of the operation display section 4, the display control part 91 obtains, from the RAM, screen data representing an operation screen corresponding to the initial function indicated by the above-mentioned initial function data. Subsequently, the display control part 91 causes the display part 411 to display an operation screen represented by the obtained screen data.

The condition setting part 92, when an execution condition is inputted via an operation screen while any of the operating sections, i.e. the image reading section 5, the image forming section 6, the sheet feeding section 7, and the communication section 8, performs its initialization processing, stores the execution condition in the storage part 93. Hereinafter, the image reading section 5, the image forming section 6, the sheet feeding section 7, and the communication section 8 will be generalizedly referred to as image processing sections.

The condition setting part 92 outputs the execution condition stored in the storage part 93 to a condition receiving part 12 described later after all of the image forming sections have completed the respective initialization processings.

On the other hand, when an execution condition is inputted via an operation screen after all of the image forming sections have completed the respective initialization processings, the condition setting part 92 outputs the execution condition to the condition receiving part 12 described later directly without storing it in the storage part 93.

Figure 3:
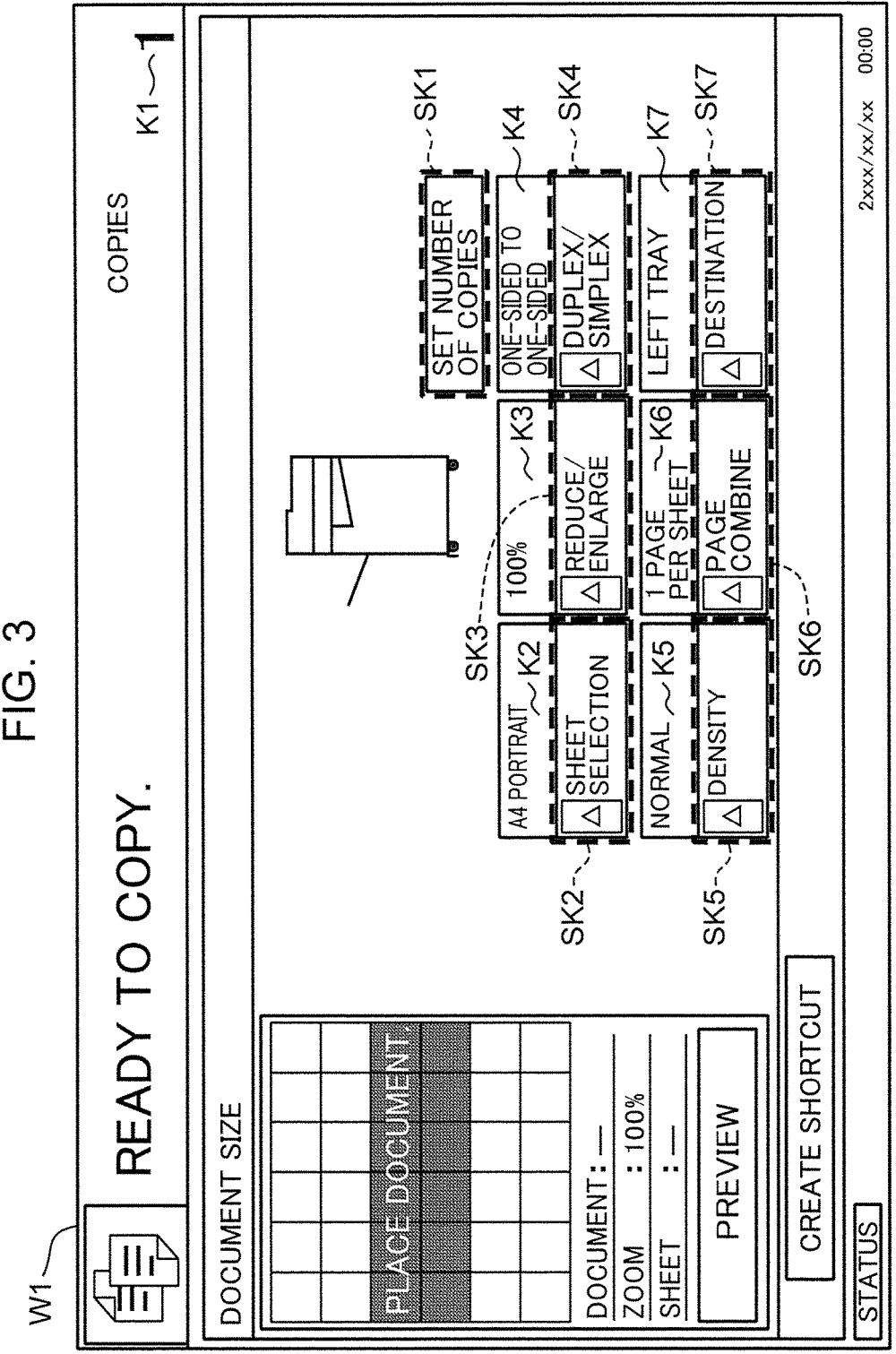
FIG. 3 is a diagram showing an exemplary operation screen.

FIG. 3 is a diagram showing an exemplary operation screen W1. For example, in a case where the above-mentioned initial function indicated by the initial function data is a copy function, the display control part 91 causes the display part 411 to display the operation screen W1 corresponding to the copy function as shown in FIG. 3 after completing the initialization processing of the operation display section 4.

The operation screen W1 includes seven soft keys for respectively allowing execution conditions for use in the image reading processing, the sheet feeding processing, and the image formation processing to be inputted. These processings are performed in execution of the copy function.

Specifically, the above-mentioned seven soft keys provided on the operation screen W1 include a copies key SK1 for inputting an execution condition specifying the number of copies, a sheet key SK2 for inputting an execution condition specifying a sheet type, a reduce/enlarge key SK3 for inputting an execution condition specifying a reduction or an enlargement, a duplex/simplex key SK4 for inputting an execution condition specifying one of two-sided printing and one-sided printing, a density key SK5 for inputting an execution condition specifying a density, a page combine key SK6 for inputting an execution condition specifying the number of pages per sheet, and a destination key SK7 for inputting an execution condition specifying a discharge destination.

A display field K1 is provided in an upper portion of the operation screen W1 for displaying the number of copies inputted via the copies key SK1 as a specified execution condition. Further, display fields K2 to K7 are provided respectively above the six soft keys SK2 to SK7 for displaying a sheet type, a reduction or an enlargement, one of two-sided printing and one-sided printing, a density, the number of pages per sheet, and a discharge destination respectively specified by execution conditions inputted via the six soft keys SK2 to SK7.

The sheet key SK2 among the seven soft keys SK1 to SK7 will be representatively described. The sheet key SK2 is a soft key for inputting an execution condition specifying a sheet type of a sheet to be supplied in the sheet feeding processing, i.e. a sheet to be subjected to image formation in the image formation processing.

When the touch panel device 41 detects that the sheet key SK2 is touched, the display control part 91 causes the display part 411 to display a plurality of soft keys over the sheet key SK2, the plurality of soft keys respectively indicating a plurality of predetermined sheet types that each can specify a sheet type as an execution condition.

For example, the plurality of sheet types include "A4 portrait", "A4 landscape", "B4 portrait", "B4 landscape", "A5 portrait", and "B5 portrait" each indicating a sheet type that can be accepted in the sheet feeding cassettes 71 (FIG. 1). When a touch operation on the sheet key SK2 is detected, the display control part 91 displays a plurality of soft keys respectively indicating, for example, "A4 portrait", "A4 landscape", "B4 portrait", "B4 landscape", "A5 portrait", and "B5 portrait" over the sheet key SK2.

When a touch operation on any of the plurality of soft keys is detected, the condition setting part 92 determines that the sheet type indicated by the touched soft key is inputted as an execution condition. Further, the display control part 91 causes the display part 411 to display in the display field K2 the sheet type indicated by the touched soft key. In this manner, the display control part 91 causes the display part 411 to display in the display field K2 the sheet type specified by an execution condition inputted via the sheet key SK2.

For example, FIG. 3 shows a screen displayed after the sheet key SK2 is touched and then the soft key indicating "A4 portrait" is touched. In other words, FIG. 3 shows a case where "A4 portrait" is inputted via the sheet key SK2 as an execution condition specifying a sheet type. It is not intended to limit the way of inputting an execution condition to the above-described way.

The condition setting part 92, when execution conditions are inputted via the seven soft keys SK1 to SK7 while any of the image processing sections is performing its initialization processing, stores the execution conditions in the storage part 93. On the other hand, when execution conditions are inputted via the seven soft keys SK1 to SK7 after all of the image processing sections have completed the respective initialization processings, the condition setting part 92 outputs the execution conditions to the condition receiving part 12 described later directly without storing them in the storage part 93.

The instruction limit part 94, when an execution instruction is inputted via the start key 45 while any of the image processing sections is performing its initialization processing, suspends output of the execution instruction to an instruction receiving part 13 described later. On the other hand, when an execution instruction is inputted via the start key 45 after all of the image forming sections have completed the respective initialization processings, the instruction limit part 94 outputs the execution instruction to the instruction receiving part 13 described later.

The lighting control part 95 turns the LED 451 off while any of the image processing sections is performing its initialization processing, and turns the LED 451 on after all of the image processing sections have completed the respective initialization processings.

The warning part 96, when an execution instruction is inputted via the start key 45 while any of the image processing sections is performing its initialization processing, causes the speaker 48 to emit the warning sound represented by the audio data stored in the RAM in the initialization processing of the operation display section 4. As described above, in the case that the speaker 48 is configured to be capable of emitting only a beep, the warning part 96 causes the speaker 48 to emit the beep as the warning sound.

The main body controller 10 is disposed inside the multifunctional apparatus 1. The main body controller 10 controls an operation of each section of the multifunctional apparatus 1. Specifically, the main body controller 10 includes an unillustrated CPU for performing a specific arithmetic processing, an unillustrated non-volatile memory such as EEPROM storing a specific control program, an unillustrated RAM for temporarily storing data, and peripheral circuits, for example.

The main body controller 10 uses the CPU to execute a control program stored in the non-volatile memory or the like to thereby operate as an initialization control part 11, the condition receiving part 12, the instruction receiving part 13, and an execution control part 14.

The initialization control part 11, when a user turns the switch section 2 to the ON state to thereby cause the power section 3 to start supply of the power supply voltage V, causes the display control part 91 to start the initialization processing (first initialization processing) of the operation display section 4. After causing the initialization processing of the operation display section 4 to start, the initialization control part 11 causes the image processing sections to start the respective initialization processings (second initialization processing).

Further, the initialization control part 11, when all of the image processing sections have completed the respective initialization processings, outputs to the operation controller 49 completion notification data indicating that all of the image processing sections have completed the respective initialization processings. In this manner, the initialization control part 11 notifies the operation controller 49 of the completion of all the initialization processings of the image processing sections.

The condition receiving part 12 accepts an input of an execution condition after all of the image processing sections have completed the respective initialization processings. Specifically, the condition receiving part 12 receives an execution condition inputted by the condition setting part 92 after all of the image processing sections have completed the respective initialization processings.

The instruction receiving part 13 accepts an input of an execution instruction after all of the image processing sections have completed the respective initialization processings. Specifically, the instruction receiving part 13 receives an execution instruction inputted by the instruction limit part 94 after all of the image processing sections have completed the respective initialization processings.

The execution control part 14, when an execution instruction is received by the instruction receiving part 13, causes the function indicated by the execution instruction to be performed under an execution condition received by the condition receiving part 12.

For example, in a case where the condition receiving part 12 receives execution conditions for the copy function and the instruction receiving part 13 receives an execution instruction of the copy function, the execution control part 14 causes the copy function to be performed under the received execution conditions for use in the execution of the copy function. Specifically, the execution control part 14, under the execution conditions, causes the image reading section 5 to perform the image reading processing and subsequently causes the image forming section 6, while causing the sheet feeding section 7 to perform the sheet feeding processing, to perform the image formation processing using image data outputted in the image reading processing and a sheet being fed in the sheet feeding processing.

Further, the execution control part 14, when execution conditions received by the condition receiving section 12 includes an inappropriate execution condition, prevents execution of the function indicated by an execution instruction received by the instruction receiving part 13, and controls the display control part 91 to cause the display part 411 to display a message indicating the inclusion of the inappropriate execution condition. The term "inappropriate execution condition" means an execution condition which cannot be achieved in execution of a selected function.

For example, "A4 portrait" is a specified sheet type as an execution condition which is received by the condition receiving part 12 after all of the image processing sections have completed the respective initialization processings, whereas the sheet feeding section 7 has determined in its initialization processing that no sheet is stored in a sheet feeding cassette 71 for storing sheets of "A4 portrait".

In this case, because there is no sheet of "A4 portrait" that is indicated by the execution condition specifying a sheet type, the copy function cannot be performed under this execution condition for the sheet type. Thus, this execution condition specifying a sheet type is an inappropriate execution condition. In this case, the execution control part 14 prevents execution of the copy function and causes the display part 411 to display a message such as "The input of 'sheet type' is inappropriate."

Figure 4:
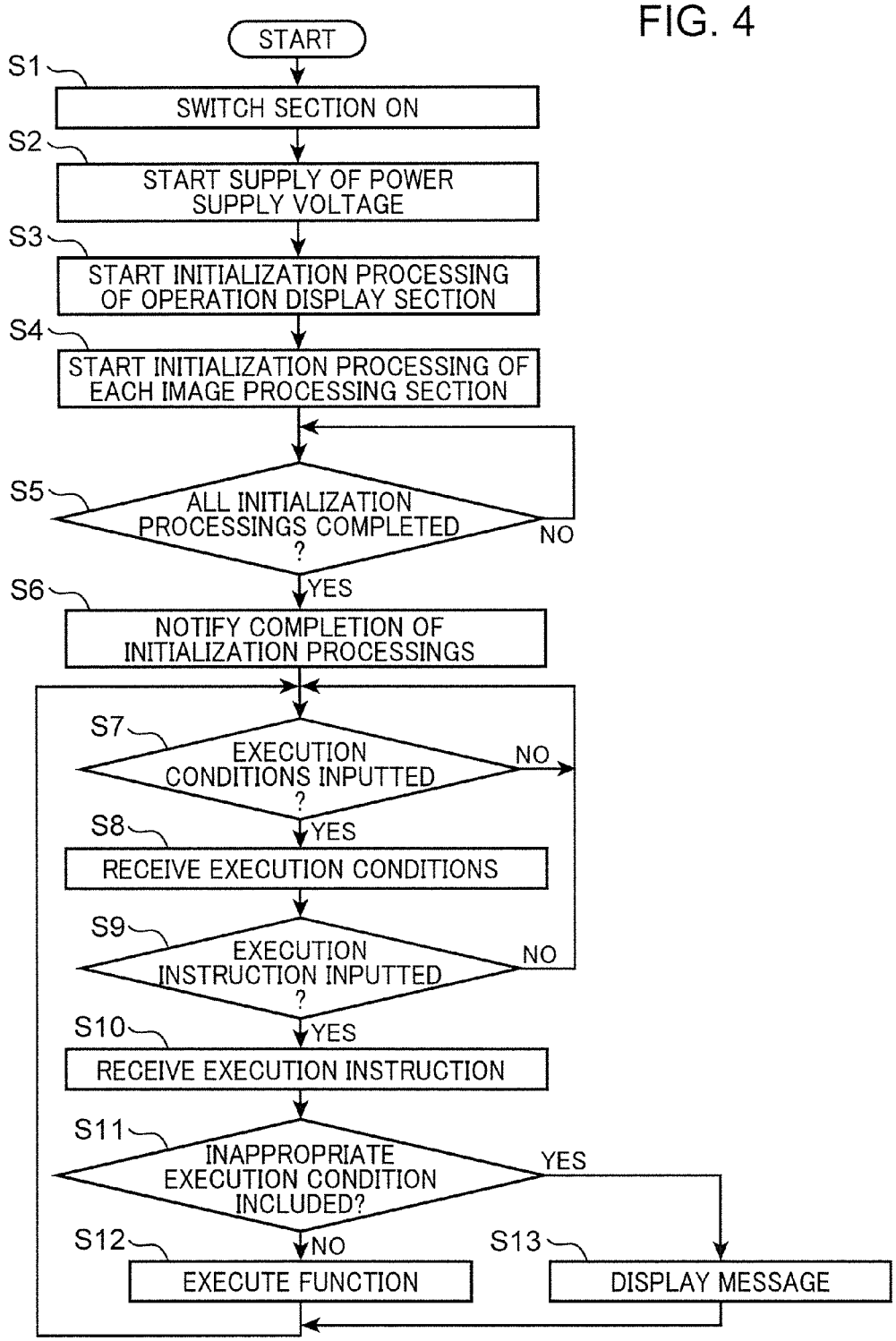
FIG. 4 is a flowchart showing an operation of a main body controller.

Hereinafter, an operation of the main body controller 10 and an operation of the operation display section 4 will be described. FIG. 4 is a flowchart showing the operation of the main body controller 10.

First, the operation of the main body controller 10 will be described. As shown in FIG. 4, when the switch section 2 is switched to the ON state by a user (S1), an alternating current voltage (external voltage) is supplied from the alternating current power supply AC to the power supply section 3 via the power cable L. This allows the power section 3 to use the alternating current voltage to generate a power supply voltage V and start to supply the generated power supply voltage V (S2).

At this time, the initialization control part 11 causes the display control part 91 to start the initialization processing of the operation display section 4 (S3). Specifically, at step 3, the initialization control part 11 obtains, from the ROM or the like, initialization data including screen data representing operation screens respectively corresponding to functions that can be performed in the multifunctional apparatus 1, audio data representing a warning sound, initial function data indicating an initial function, and default values of execution conditions for the functions, for example. Subsequently, the initialization control part 11 outputs the obtained initialization data to the operation controller 49. An operational step of the operation display section 4 performed at this time will be described later.

Subsequently, the initialization control part 11 causes the image processing sections (the image reading section 5, the image forming section 6, the sheet feeding section 7, and the communication section 8) to start the respective initialization processings (S4).

When all of the image processing sections have completed the respective initialization processings (S5; YES), the initialization control part 11 outputs to the operation controller 49 completion notification data indicating that all of the image processing sections have completed the respective initialization processings. In this manner, the initialization control part 11 notifies the operation controller 49 of the completion of all the initialization processings of the image processing sections (S6).

When execution conditions are inputted to the condition receiving part 12 by the condition setting part 92 after step 6 (S7; YES), the condition receiving part 12 receives the execution conditions (S8).

When no execution instruction is inputted to the instruction receiving part 13 by the instruction limit part 94 after the execution condition is received by the condition receiving part 12 (S9; NO), the operation returns to step S7. When an execution instruction is inputted to the instruction receiving part 13 by the instruction limit part 94 after the execution condition is received by the condition receiving part 12 (S9; YES), the instruction receiving part 13 receives the execution instruction (S10).

When the execution instruction is received by the instruction receiving part 13, the execution control part 14 determines whether the execution conditions received at step S8 includes an inappropriate execution condition (S11).

The execution control part 14, when determining at step S11 that no inappropriate execution condition is included (S11; NO), causes the function indicated by the execution instruction received at step S10 to be performed under the execution conditions received at step S8 (S12).

On the other hand, the execution control part 14, when determining at step S11 that an inappropriate execution condition is included (S11; YES), prevents execution of the function indicated by the execution instruction received at step S10 and controls the display control part 91 to cause the display part 411 to display a message indicating the inclusion of the inappropriate execution condition (S13).

After step S12 or step S13, the operation returns to step S7.

Figure 5:
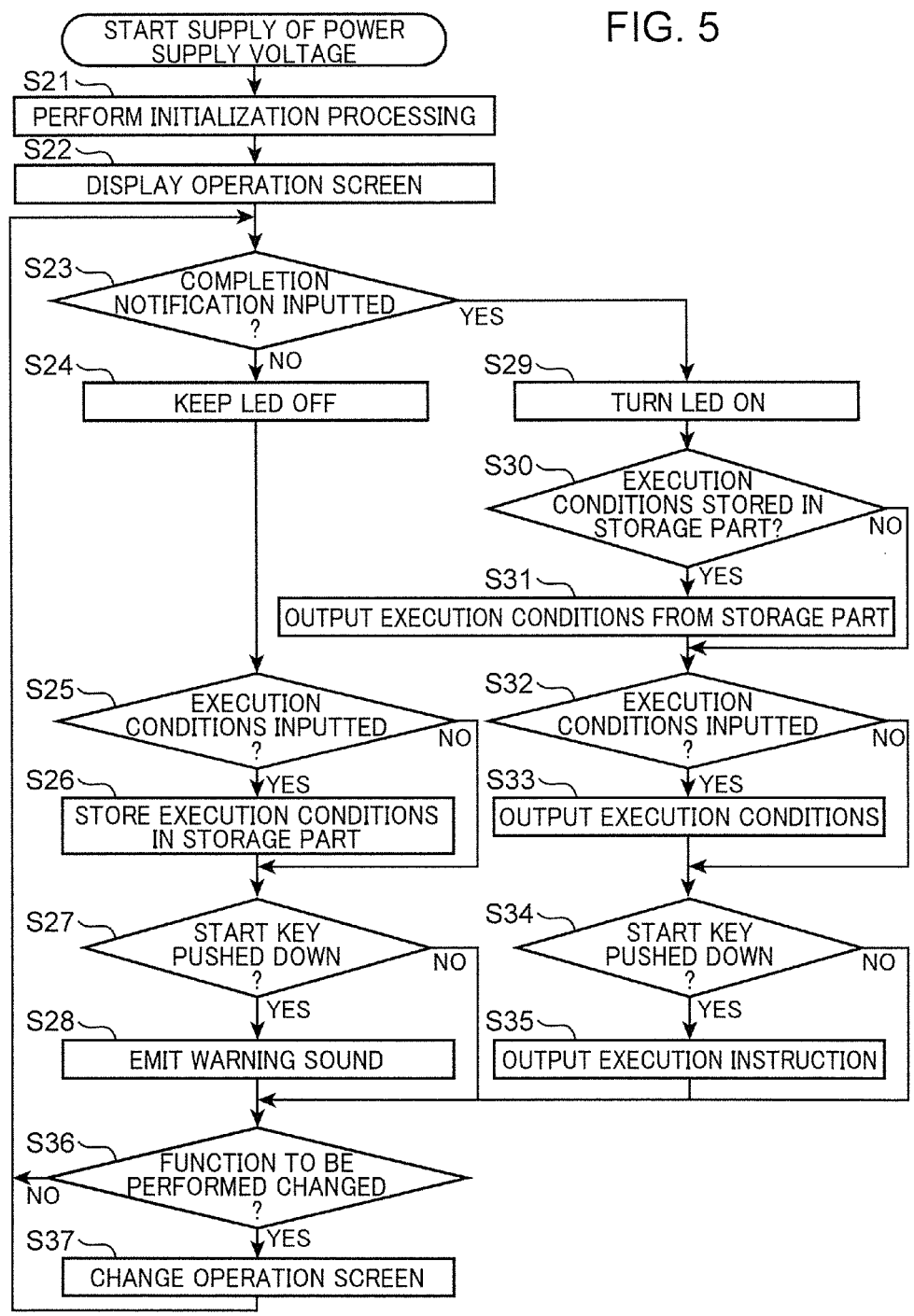
FIG. 5 is a flowchart showing an operation of an operation display section.

Hereinafter, the operation of the operation display section 4 will be described. FIG. 5 is a flowchart showing the operation of the operation display section 4. As shown in FIG. 5, after the supply of the power supply voltage V to the operation display section 4 is started as a result of steps S1 (FIG. 4) and S2 (FIG. 4), the display control part 91 performs the initialization processing of the operation display section 4 under the control of the initialization control part 11 at step S3 (step S21).

At step S21, the display control part 91 obtains the initialization data which the initialization control part outputs to the operation controller 49 at step S3 (FIG. 4), and stores the obtained initialization data in the RAM. As described above, the initialization data includes the screen data representing operation screens, the audio data representing a warning sound, the initial function data indicating an initial function, and the default values of execution conditions for the functions, for example.

After completing the initialization processing of the operation display section 4, the display control part 91 obtains, for example, screen data representing an operation screen (for example, the operation screen W1 (FIG. 3)) corresponding to the initial function indicated by the initial function data from the RAM. Subsequently, the display control part 91 causes the display part 411 to display the operation screen represented by the obtained screen data (S22).

At step S22, the display control part 91 obtains default values of execution conditions for the initial function from the RAM, and causes the display part 411 to display the obtained default values in their respective display fields on the operation screen (for example, the display fields K1 to K7 in the case of the operation screen W1).

This flow will see a case that any of the image processing sections has not completed its initialization processing to allow step S6 (FIG. 4) to be performed, in other words, when no completion notification data is inputted to the operation controller 49 and, therefore, the operation controller 49 is not notified of completion of all the initialization processings of the image processing sections (S23; NO).

In this case, the lighting control part 95 keeps the LED 451 off (S24). When execution conditions are inputted via the operation screen (S25; YES), the condition setting part 92 stores the inputted execution conditions in the storage part 93 (S26).

In the case that the operation controller 49 is not notified of completion of all the initialization processings of the image processing sections when default execution condition values are displayed on the operation screen at step S22 or step S37 described later (S23; NO), the condition setting part 92 determines, based on the display of the default values, that execution conditions are inputted (S25; YES), and performs step S26. At step S26, the condition setting part 92 stores in the storage part 93 the execution conditions displayed on the operation screen at step S22 or step S37 described later as execution conditions inputted via the operation screen.

Thereafter, when a user pushes down the start key 45 to thereby input an execution instruction to execute the function corresponding to the operation screen (S27; YES), the instruction limit part 94 suspends output of the execution instruction to the instruction receiving part 13. In this case, the warning part 96 causes the speaker 48 to emit the warning sound represented by the audio data stored in the RAM (S28).

On the other hand, this flow will see a case that step S6 (FIG. 4) is performed owing to completion of all the initialization processings of the image processing sections, in other words, when completion notification data is inputted to the operation controller 49 and, therefore, the operation controller 49 is notified of completion of all the initialization processings of the image processing sections (S23; YES).

In this case, the lighting control part 95 turns the LED 451 on (S29). In the case that execution conditions are stored in the storage part 93 (S30; YES), the condition setting part 92 obtains the execution conditions from the storage part 93 and outputs the obtained execution conditions to the condition receiving part 12 (S31). After outputting the execution conditions at step S31, the condition setting part 92 deletes the execution conditions stored in the storage part 93.

Thereafter, when execution conditions are inputted via the operation screen (S32; YES), the condition setting part 92 outputs the inputted execution conditions to the condition receiving part 12 without storing them in the storage part 93 (S33).

In the case that the operation controller 49 is notified of completion of all the initialization processings of the image processing sections when default execution condition values are displayed on the operation screen at step S22 or step S37 described later (S23; YES), the condition setting part 92 determines, based on the display of the default values, that execution conditions are inputted (S32; YES), and performs step S33. At step S33, the condition setting part 92 outputs to the condition receiving part 12 the execution conditions displayed on the operation screens at step S22 or step S37 described later as execution conditions inputted via the operation screen.

Thereafter, when a user pushes down the start key 45 to thereby input an execution instruction to execute the function corresponding to the operation screen (S34; YES), the instruction limit part 94 outputs the execution instruction to the instruction receiving part 13 (S35).

Thereafter, the operation returns to step S23 if a user does not push down the function selector switch 44 to change the aimed function (S36; NO). When a user pushes down the function selector switch 44 to thereby change the aimed function (S36; YES), the display control part 91 obtains from the RAM screen data representing an operation screen corresponding to the selected function. Subsequently, the display control part 91 causes the display part 411 to display the operation screen represented by the obtained screen data in place of the operation screen being displayed (S37). Thereafter, the operation returns to step S23.

In this manner, in the above-described embodiment, when, while any of the image processing sections is performing its initialization processing (S23; NO), execution conditions are inputted via the operation screen (S25; YES), the execution conditions are stored in the storage part 93 (S26). Upon completion of all the initialization processings of the image forming sections (S23; YES), the execution conditions stored in the storage part 93 are outputted to the condition receiving part 12 (S33).

Therefore, a user is allowed to input an execution condition for a function during the time after the user operates the switch section 2 to start supply of an alternating current voltage until all of the image processing sections have completed the respective initialization processings. Further, it is possible to cause the condition receiving part 12 to receive the execution condition inputted during this time period after this time period. Therefore, a user standing in front of the multifunctional apparatus 1 being supplied with no alternating current voltage is allowed to input an execution condition during the above-mentioned time period to make it possible to execute the function under the inputted execution condition immediately after the above-mentioned time period.

Further, in the above-described embodiment, when an execution instruction is inputted via the start key 45 while any of the image processing sections is performing its initialization processing (S23; NO, S27; YES), output of the execution instruction to the instruction receiving part 13 is suspended, and when an execution instruction is inputted via the start key 45 after all of the image processing sections have completed the respective initialization processings (S23; YES, S34; YES), the execution instruction is outputted to the instruction receiving part 13 (S35).

Therefore, it is possible to cause the instruction receiving part 13 to receive an execution instruction only when all of the image processing sections have completed the respective initialization processings. Consequently, a function is performed only when all of the image processing sections have completed the respective initialization processings and is therefore less likely to be performed abnormally.

Further, in the above-described embodiment, while any of the image processing sections is performing its initialization processing (S23; NO), the LED 451 is turned off (S24), and after all of the image processing sections have completed the respective initialization processings (S23; YES), the LED 451 is turned on (S29). Therefore, a user can easily see whether the multifunctional apparatus 1 is in a state that a function can be performed based on whether the LED 451 is turned on or off.

Further, in the above-described embodiment, when, while any of the image processing sections is performing its initialization processing (S23; NO), an execution instruction is inputted via the start key 45 (S27; YES), a warning sound is emitted (S28). This allows a user to easily notice that the multifunctional apparatus 1 is in a state that the selected function can be performed by hearing the warning sound.

Further, in the above-described embodiment, in the case that execution conditions received by the condition receiving part 12 includes an inappropriate execution condition (S11; YES), the function indicated by the execution instruction received by the instruction receiving part 13 is not performed and the display part 411 is caused to display a message indicating the inclusion of the inappropriate execution condition (S13). This allows a user to input a new execution condition to replace the inappropriate execution condition immediately after seeing the message.

The above-described embodiment merely exemplifies an embodiment according to the present disclosure, and it is not intended to limit the present disclosure to the above embodiment. For example, the following modified embodiments may be adopted.

(1) Step S13 (FIG. 4) may be omitted when the execution control part 14 determines at step S11 (FIG. 4) that execution conditions received at step S8 (FIG. 4) include an inappropriate execution condition. In this case, the execution control part 14 may be made to replace the inappropriate execution condition with a default value for the execution condition stored in the ROM or the like. Further, the execution control part 14 may be made to cause the function indicated by the execution instruction received at step S10 (FIG. 4) to be performed under the new execution condition.

(2) The operation controller 49 may be made not to operate as the warning part 96, so that step S28 (FIG. 5) is omitted.

(3) The start key 45 may be configured without the LED 451, and the operation controller 49 may be made not to operate as the lighting control part 95, so that steps S24 (FIG. 5) and S29 (FIG. 5) are omitted.

(4) The operation controller 49 may be made not to operate as the instruction limit part 94, and the operation controller 49 may be made, when an execution instruction is inputted via the start key 45 (S27; YES, S34; YES), to output the execution instruction to the instruction receiving part 13 regardless of whether or not all of the image processing sections have completed the respective initialization processings. It should be noted that, in this case, the instruction receiving part 13 does not receive the inputted execution instruction when any of the image processing sections is performing its initialization processing as described above.

According to the present disclosure described above, it is possible to cause an image processing apparatus to perform an image processing immediately after a user standing in front of the image processing apparatus being supplied with no alternating current voltage performs an operation to start supply of an external voltage.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image processing apparatus, comprising:
a switch section to be operated to start supply of an external voltage;
a power supply section using the external voltage to generate a power supply voltage and supply the generated power supply voltage;
an operation display section using the power supply voltage to perform an operation;
an image processing section using the power supply voltage to perform a specific image processing; and
a main body controller using the power supply voltage to perform an operation and including a first CPU, a first non-volatile memory, and a first RAM, wherein
the main body controller being configured to operate as:
an initialization control part for outputting screen data to the operation display section, the screen data representing operation screens for allowing an execution condition for use in the image processing to be inputted and causing the operation display section to start a predetermined first initialization processing when the power supply section starts to supply the power supply voltage in response to the operation of the switch section by a user, and causing the image processing section to start a predetermined second initialization processing after the start of the first initialization processing; and
a condition receiving part for accepting an input of the execution condition after completion of the second initialization processing,
the operation display section includes:
a display part; and
an operation controller including a second CPU, a second non-volatile memory, and a second RAM, the operation controller using a part of a storage region of the second RAM as a storage part, and the operation controller further being configured to operate as:
- a display control part for storing the screen data obtained from the initialization control part in the storage part during the first initialization processing, obtaining the screen data from the storage part after completion of the first initialization processing, and causing the display part to display the operation screen represented by the obtained screen data; and
- a condition setting part for, when the execution condition is inputted via the operation screen during the second initialization processing, storing the execution condition in the storage part and, in a case where the execution condition is stored in the storage part after completion of the second initialization processing, outputting the execution condition stored in the storage part to the condition receiving part and subsequently deleting the execution condition stored in the storage part, thereafter, when the execution condition is inputted via the operation screen, outputting the inputted execution condition to the condition receiving part without storing the inputted execution condition in the storage part.

2. An image processing apparatus according claim 1, wherein the main body controller is configured to operate as:
an instruction receiving part for accepting an input of an execution instruction to execute the image processing; and
an execution control part for, when the execution instruction is received by the instruction receiving part, causing execution of the image processing under the execution condition received by the condition receiving part, the operation display section further includes
a start key to be pushed by a user for allowing an input of the execution instruction, and
the operation controller is configured to operate as
an instruction limit part for suspending output of the execution instruction to the instruction receiving part when the execution instruction is inputted via the start key during the second initialization processing, and outputting the execution instruction to the instruction receiving part when the execution instruction is inputted via the input part after the completion of the second initialization processing.

3. An image processing apparatus according claim 2, wherein
the start key includes a light emitting element, and
the operation controller further is configured to operate as
a lighting control part for turning the light emitting element off during the second initialization processing and turning the light emitting element on after the completion of the second initialization processing.

4. An image processing apparatus according claim 2, wherein
the operation controller further is configured to operate as
a warning part for emitting a specific warning sound when the execution instruction is inputted via the start key during the second initialization processing.

5. An image processing apparatus according claim 2, wherein
the execution control part, when the execution condition received by the condition receiving part includes an inappropriate execution condition, prevents the image processing section from performing the image processing and causes the display part to display a message indicating the inclusion of the inappropriate execution condition.

* * * * *